United States Patent [19]

Herzberg et al.

[11] Patent Number: 5,282,199
[45] Date of Patent: Jan. 25, 1994

[54] METHOD AND APPARATUS FOR INTEROPERATION OF FDDI-I AND FDDI-II NETWORKS

[75] Inventors: Louis P. Herzberg, Monsey; Baiju V. Patel, Mt. Kisco; Antonio Ruiz, Yorktown Heights; Frank A. Schaffa, Ossining; Marc H. Willebeek-LeMair, Mt. Kisco, all of N.Y.

[73] Assignee: International Business Machines Corporation, Armonk, N.Y.

[21] Appl. No.: 997,795

[22] Filed: Dec. 29, 1992

[51] Int. Cl.⁵ .............................. H04J 3/00; H04J 3/16
[52] U.S. Cl. .............................. 370/85.14; 370/85.12; 370/85.13; 370/85.15
[58] Field of Search ............... 370/85.12, 85.13, 85.14, 370/85.15, 85.4, 85.5, 68, 58.1, 85.1, 85.2, 85.3, 85.4, 85.13, 85.14; 340/825.05, 825.5

[56] References Cited

U.S. PATENT DOCUMENTS

| | | | |
|---|---|---|---|
| 4,539,679 | 9/1985 | Bux et al. | 370/85.14 |
| 4,549,291 | 10/1985 | Renoulin et al. | 370/85.5 |
| 4,587,651 | 5/1986 | Nelson et al. | 370/68 |
| 4,843,606 | 7/1989 | Bux et al. | 370/58.1 |
| 4,999,832 | 3/1991 | Chen et al. | 370/85.14 |
| 5,051,986 | 9/1991 | Grow et al. | 370/85.4 |
| 5,191,580 | 3/1993 | Nakano et al. | 370/85.5 |

Primary Examiner—Douglas W. Olms
Assistant Examiner—Huy D. Vu
Attorney, Agent, or Firm—Whitham & Marhoefer

[57] ABSTRACT

A method and apparatus allow the interoperability of a token ring packet data network managed by the timed-token protocol (FDDI-I) and a TDM network (FDDI-II) with a given bandwidth allocation assigned to the packet data timed-token protocol. Only a single token is used, and the delay and loss of packets which cannot be transmitted on account of limited bandwidth is reduced. The flow of packets into the slots of the communications ring following the TDM protocol is controlled by varying the amount of time in which the token is held by the interface between the two communication rings. That is, the time in which the token is held by the interface is a function of the number TDM slots allocated to the transmission of packet data.

9 Claims, 4 Drawing Sheets

Packet Data Side

A — Time Slot Separation Element (TSSE)

B — Time Slot Insertion Element (TSIE)

C — Data Rate Adjustment Element (DRAE)

A — Time Slot Separation Element (TSSE)

B — Time Slot Insertion Element (TSIE)

C — Data Rate Adjustment Element (DRAE)

METHOD AND APPARATUS FOR INTEROPERATION OF FDDI-I AND FDDI-II NETWORKS

BACKGROUND OF THE INVENTION

1. Field of the Invention

The present invention generally relates to local area networks (LANs) employing a token-based ring-of-trees topology and, more particularly, to a method and apparatus for allowing interoperation of a token ring packet data network managed by a timed-token protocol (Fiber optic Distribution Data Interface-I or FDDI-I) with a time division multiplexed network which allocates a portion of its bandwidth to the packet data timed-token protocol (Fiberoptic Distribution Data Interface-II or FDDI-II).

2. Description of the Prior Art

The interconnection and interoperation of distributed computing devices is an old but continuing challenge. In recent years many of those who have thought about this challenge have concluded that the most effective way to promote progress is to parse the task into relatively independent but connected pieces and develop a corresponding set of standards. Different systems can then communicate if they follow the standards at their corresponding levels; they may rely upon parallel coordination through standards at other levels to complete the communication path. The Open Systems Interconnection (OSI) reference model reflects this view.

The OSI model defines seven layers—from the physical link dealing with mechanical, electrical and optical characteristics of signals to the application layer which provides file transfer and network management services to users. Local area network (LAN) standards within the OSI model are the subject matter and constraints for the present invention. Local area networks are characterized by a topology (e.g. ring or bus) for connecting devices to the LAN's signal transmission media (e.g. cable or optical fiber) and a protocol (e.g. token-ring or timed-token) for controlling access to the medium by an attached device.

Communication capacity over a LAN is limited by the transmission medium, and also by the topology and the relevant protocols at both the physical and media access control levels. "Bandwidth" is a measure of the communication capacity of a LAN, and is commonly given in bits per second. For example, the bandwidth of a coaxial cable Ethernet LAN may be 10 million bits per second (Mbps) while a Fiber optic Distributed Data Interface (FDDI) LAN using a timed-token protocol may be 100 Mbps.

However, these figures are nominal capacities. Typically, the aggregate communication needs of devices attached to a LAN are an irregular mix of stream and bursty traffic. The LAN's capacity may be underutilized at one time and overloaded at another.

The FDDI standard did not allow for isochronous packet switched data, such as voice and video. Consequently, an enhanced version of the standard, FDDI-II, was developed. FDDI-II accommodated isochronous data through time division multiplexing of the available bandwidth, allocating a portion of that bandwidth to the timed-token protocol used in FDDI.

SUMMARY OF THE INVENTION

It is therefore an object of the present invention to permit FDDI-I and FDDI-II networks to interoperate.

This invention consists of the addition to an FDDI-I ring of the ability to interconnect and communicate with standard FDDI-II stations by exchanging FDDI packetized frames via a special concentrator. The connection is made in such a way that the FDDI-I ring stations and the FDDI-II stations operate in apparent total conformance with their respective standards and specifications. The concentrator performs the functions required to allow compatible packetized information exchange among all FDDI-II and FDDI-I stations. Such a concentrator is herein referred to as a Hybrid Mode Interface (HMI) concentrator. The HMI acts as the surrogate station for token claim processes for all the stations on its M-ports (henceforth referred to as its membership) as they would appear in standard FDDI-I sequence as individual stations competing for the FDDI-I token timing and capture. The backend ports operate in synchronism with the Cycle Master as required by a standard FDDI-II station. The performance resulting from the implementation of this invention is transparent to the individual stations and the ring in a way that is advantageous to both packet data and isochronous data for multimedia usages.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is a method and apparatus for interconnecting FDDI and FDDI-II networks, remaining in conformance with FDDI and FDDI-II standards.

TOKEN RING

A token ring network consists of nodes organized in a ring topology, wherein all nodes share the communication media and access to the media is controlled with a token. Each station receives information from its upstream neighbor and transmits to its downstream neighbor. The token is defined as a special code of bits that is passed from one station to the next to allow all stations a transmission opportunity. In the simplest scheme, each node is allowed to transmit a single frame each time it receives the token.

This scheme is fair but inefficient and does not provide a means of allocating bandwidth or adjusting the access time guarantees. A detailed description of the token ring network is contained in *The Handbook of Computer Communications Standards*, Volume 2, by William Stallings, pp. 156-178, Howard W. Sams and Company, 1990.

TIMED TOKEN PROTOCOL

The protocol used for controlling access by individual nodes to the shared communication media (Media Access Control or MAC) in the Fiber Distributed Data Interface (FDDI) standard is the timed-token protocol. This access protocol allows for bandwidth allocation and tunable access delay guarantees. The timed-token protocol is based on a target token rotation time (TTRT), and is controlled by synchronized timers in each node of the ring. The TRT (token rotation time) timer in each station monitors the circulation of the token. The timer is used to make sure that the token rotation time does not exceed the TTRT. This timer is used to regulate the amount of information that each node can transmit onto the ring when the token is captured. The token is used to insure fair access and provide guaranteed access delay and bandwidth bounds. A detailed description of the timed-token protocol is contained in *The Handbook of Computer Communications Standards*, supra, at pp. 181-193.

The process of renegotiating a value for TTRT is begun when an error condition is detected. For example, if a station detects that it has not seen a valid token in a time significantly greater than TTRT, it assumes an error condition and issues Claim frames which contain bids for the value of TTRT, under the following rules: 1) a station will transmit whatever Claim frame (its own or that which it receives) has highest precedence; 2) the frame with lowest TTRT has precedence; 3) if TTRT is the same, the frame with the longest source address and then the highest address takes precedence. The process completes when a station receives its own Claim frame, which means that the ring is filled with these frames, all other claimants having yielded. The TTRT is then used by each station to reset TRT. The claiming victor is responsible for initiating an initialization process by issuance of an unrestricted token.

TDM NETWORK

Figure 1:
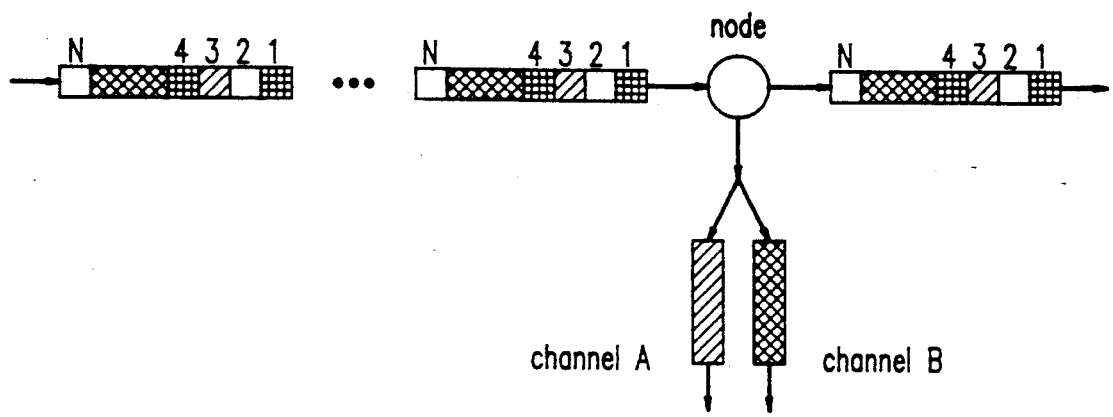
FIG. 1 is a schematic diagram showing how a TDM network is divided into channels comprised of one or more slots.

A Time Division Multiplexed (TDM) network divides its bandwidth into time slots. These slots occur in constant time intervals to which receiving and transmitting stations may synchronize, as illustrated in FIG. 1. Here, the network bandwidth is divided into N timeslots. A channel can be defined in terms of these slots. For example, channel A in FIG. 1 is defined as the third slot of every N slots. Consequently, a node communicating via channel A could ignore all slots except for the third and parse all information arriving in that slot into meaningful data units. More complex channels, such as channel B in FIG. 1 may combine several slots to form a channel. The node must be intelligent enough to parse the information correctly in order to organize it as the transmitter intended it.

A TDM channel can itself be managed by any one of many protocols. If the channel is shared by many stations in a ring configuration, the channel could, for example, be managed by the timed-token protocol. All stations would access the channel and manage their transmission based on the timed-token protocol. Hence, although other channels of information are present in the network, these are simply ignored (or used for other purposes).

For a token ring network managed by the timed-token protocol to interoperate with a TDM network within which a given channel was assigned to the timed token protocol, the state-of-the-art interface between the two is achieved using a bridge. A discussion of bridges can be found in *Interconnections: Bridges and Routers* by Radia Perlman, Addison Wesley, 1992. An example of bridged solution is also presented in Michael Teener, "An FDDI-FDDI-II Interoperation Strategy", *Wescon/90*, Nov. 13-15, 1990. The use of a bridge, however, introduces additional delays (due to queuing and access time), and can lead to packet loss due to queue overflows when the available bandwidth on one side is less than the other side.

Standard FDDI-I utilization does not have the ability to interconnect or intercommunicate with FDDI-II stations via its ring. This is a result of the very different protocols and operating requirements and modes specified by the FDDI-II standards. Whereas the FDDI-I is totally based on a dual ring topology employing a time-token protocol operating solely on contiguous information packets, FDDI-II stations are required to also operate in a hybrid mode of time assigned "Wideband Channels" capable of carrying non-contiguous packet and circuit-switched information. This provides FDDI-II stations with the ability to satisfy desired LAN enhancements for expanded multimedia usages. In the hybrid mode, FDDI-II stations can transport either or both circuit-switched and packetized traffic. The circuit switched transmissions are isochronous in nature and require a periodic time allocation only provided by the Hybrid Mode. This is not defined, nor is it recognized, by a standard FDDI-I station. Thus, although almost all present FDDI networks are implementations of FDDI-I protocols, these do not have the ability to inter-communicate with the newly developing FDDI-II protocols. This is particularly a problem when it is required to combine the voice or text of existing FDDI-I stations with motion video of an FDDI-II station.

Figure 2:
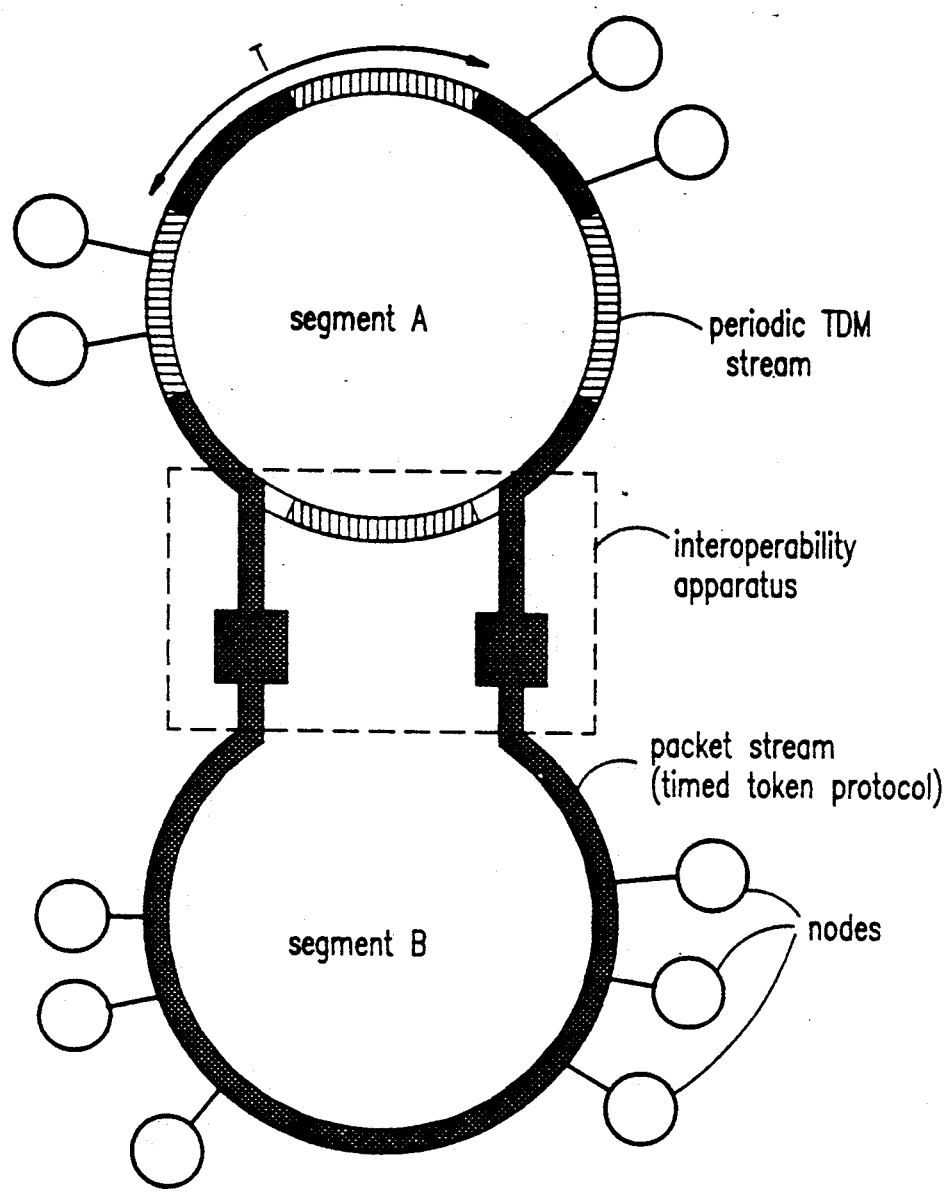
FIG. 2 is a schematic diagram showing a network consisting of a token ring segment and a TDM segment with a token ring channel.

For example, let a network be divided into two segments A and B as shown in FIG. 2, where segment A is a periodic TDM LAN with bandwidth $\beta_A$, and segment B is a timed token LAN with bandwidth $\beta_B$. The TDM LAN segment has a period T divided into k slots. Of those k slots, $k_B$ slots are dedicated to the packet data timed-token transmission used in segment B. Consequently, only a fraction $k_B/K$ of segment A's bandwidth $\beta_A$ is available for the packet transmission of segment B. In the case where $$\frac{k_B}{k} \beta_A < \beta_B,$$

the fraction of bandwidth through segment A, allocated for packet transmission from segment B, is not enough to sustain the full transmission capability of segment B. This can lead to packet-loss or expiration of station timers due to token tardiness.

A mechanism is required to control the amount of packets transmitted in segment B to allow the steady flow of packets from segment B through the lesser bandwidth available in segment A, so as to prevent expiration of station timers and satisfy the timed-token protocol requirements. Due to the fact that transmission in segment B is controlled via a timed-token protocol transmission can be regulated by manipulation of the token. The amount of available bandwidth is reflected in the token timers in each node in the network. By holding the token and allowing the timers to increment, each node's perception of the amount of available bandwidth can be controlled.

Figure 3:
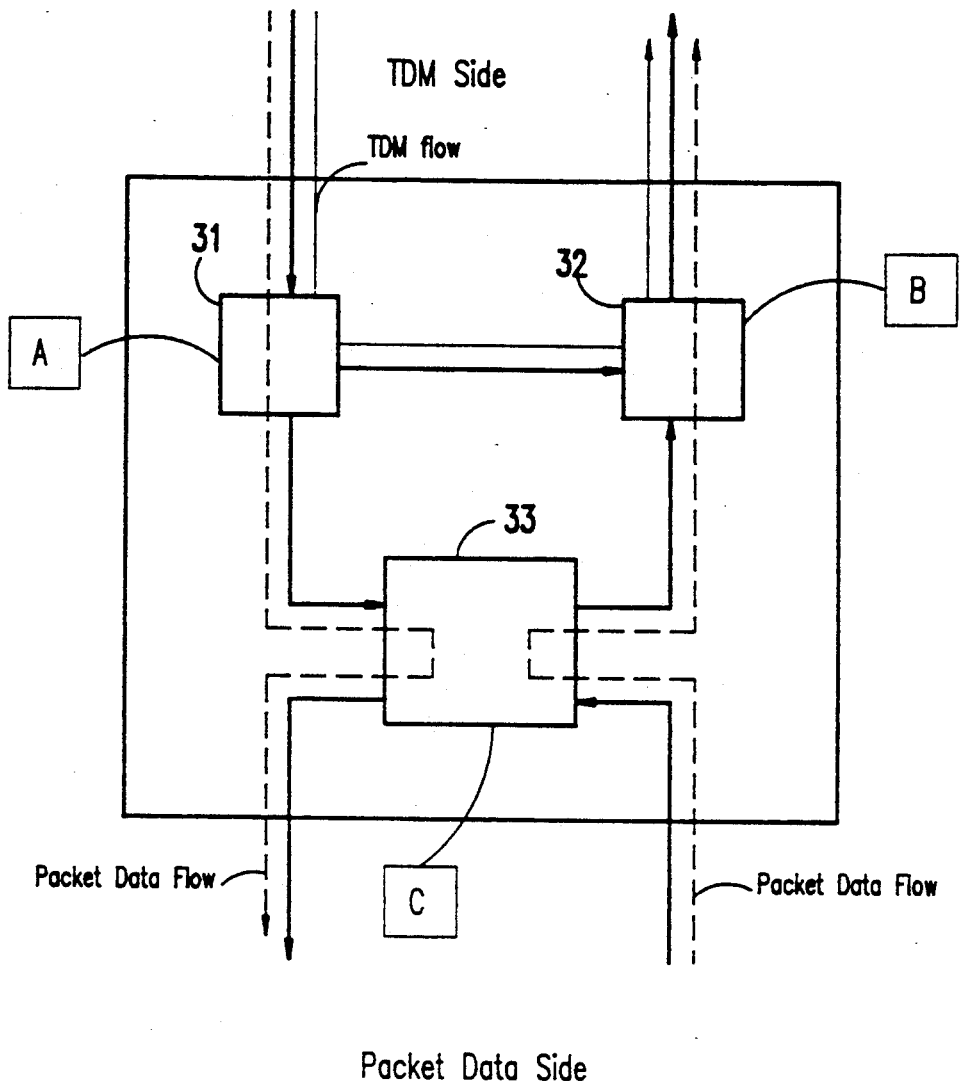
FIG. 3 is a block diagram of the interoperation apparatus.

The apparatus designed to implement this interoperation is illustrated in FIG. 3. It comprises a Time Slot Separation Element (TSSE) 31, a Time Slot Insertion Element (TSIE) 32, and a Data Rate Adjustment Element (DRAE) 33. The TSSE 31 separates packet data slots out of TDM slots and forwards them to the DRAE. The TSSE 31 also replaces the packet data slots with null symbols and forwards the TDM slots to the TSIE 32. The TSIE 32 inserts packet data into the packet data slots of the TDM slots. The DRAE 33 assembles frames arriving from the TSSE 31 and disassembles frames arriving from the token-based ring to be sent by the TSIE 32. The DRAE 33 also adjusts the bandwidth allocation on the token-based ring side to reflect the TDM bandwidth allocation for packet data. In the timed-token protocol this can be done by holding the token for a period of time necessary to reflect the difference in bandwidth between the TDM channel segment and the token-based ring segment.

Figure 4:
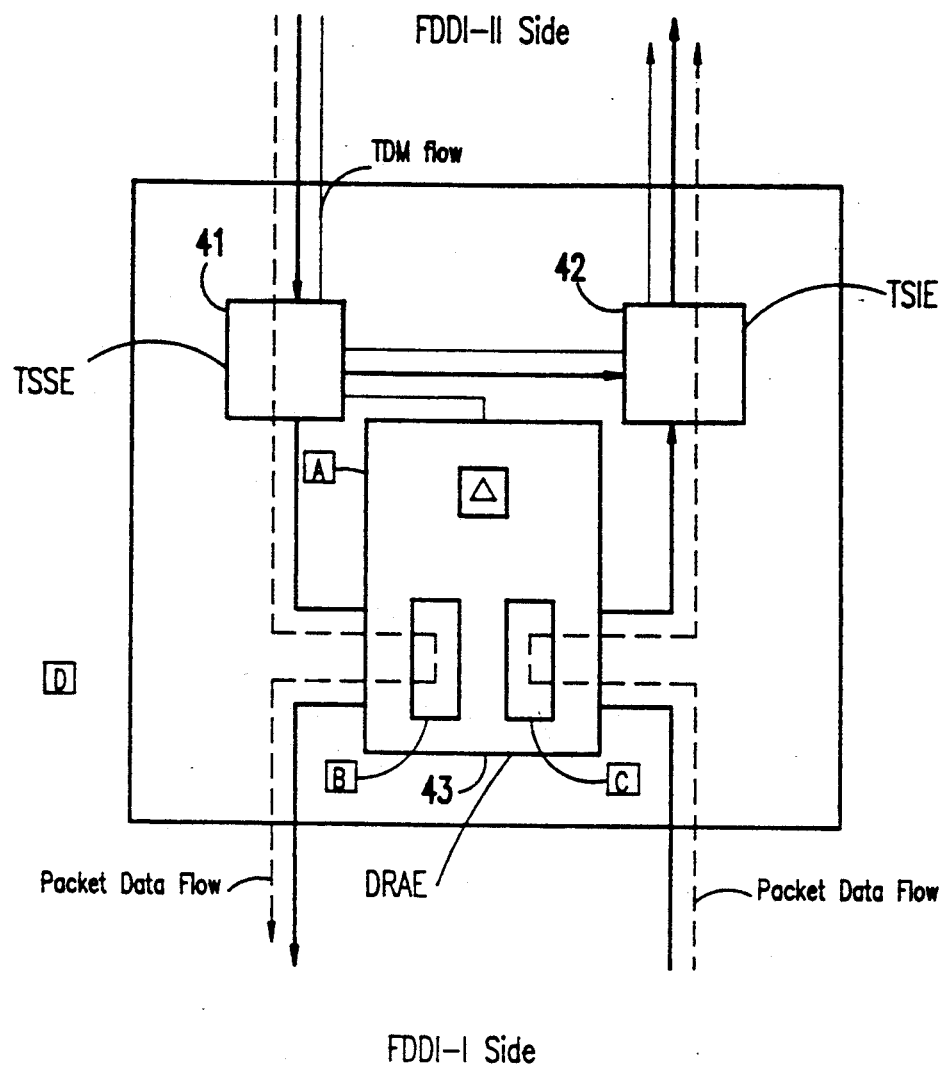
FIG. 4 is a block diagram of a preferred implementation of FDDI-I and II interoperability.

A preferred implementation describing the interoperation of FDDI-I (token ring managed by the timed-token protocol) and FDDI-II (a TDM network with a portion of the bandwidth allocated to the timed-token protocol) is shown with reference to FIG. 4. For a reference on FDDI see Floyd E. Ross, "FDDI-A Tutorial", Vol. 24, No. 5, *IEEE Communications Magazine*, pp. 10–17, May 1986. Ramiro Calvo and Michael Teener, "FDDI-II Architectural and Implementation Examples", *IFOC/LAN* 90, Jun. 27–29, 1990.

In FIG. 4, data arriving from the FDDI-II connection into the TSSE 41 is divided into isochronous slots and packet data slots (as determined in the cycle header). Data from the packet data slots are routed to the DRAE 43, and data within the isochronous slots are directly routed to the TSIE 41. In the path from the TSSE 41 to the TSIE 42, data within packet data slots are replaced with IDLE symbols (or NULL frames). Packet data arriving at the DRAE 43 from the TSSE 41 is packed into contiguous blocks of data frames before being routed to the FDDI-I connection. Packet data frames arriving from the FDDI-I connection to the DRAE 43 are unpacked to fit into the FDDI-II packet data slots and forwarded to the TSIE 42 is a synchronized fashion.

In order to provide interoperability between the FDDI-I and FDDI-II nodes, all node timers must be kept from expiring. To do so, the time between token frame headers arriving at each node (the Token Rotation Time) must be kept below the negotiated TTRT delay. In order to guarantee this, the DRAE 43 must control the rate at which the FDDI-I packet data nodes transmit data into the ring. This can be accomplished by monitoring the Token Rotation Time and holding the token before releasing it into the packet data (FDDI-I) connection. Element C in the DRAE 43 measures the delay, $\beta$, added to the token rotation time $t_{trt}$ due to the insertion of data from the FDDI-I side to the FDDI-II side (initialized as 0). Upon receipt of the token at Element B in the DRAE 43, Element A computes the additional token delay ($\Delta$) it will add as a flow control mechanism before forwarding the token to the FDDI-I segment, $$\Delta = \left(1 - \frac{p}{q}\right) t_{trt} - t_1 - \beta,$$

where p is the time within a TDM cycle that is reserved for packet data (detected in the cycle header in the TSSE), q is the cycle time, $t_{trt}$ is the Target Token Rotation Time, and $t_1$ is the ring latency (computed in the TSSE at initialization time or set to a predetermined default).

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of transmitting data between a timed token ring network and a time division multiplexed ring network, comprising the steps of:

inserting an interface between said timed token ring network and said time division multiplexed ring network;

converting time division multiplexed data arriving from said time division multiplexed ring network into data packets compatible with said timed token ring network and allowing said data packets to circulate around said timed token ring network;

reserving space on said time division multiplexed ring network;

converting data packets arriving from said timed token ring network into time division multiplexed data compatible with said time division multiplexed ring network;

inserting said time division multiplexed data into said space on said time division multiplexed ring network; and adding a delay to a token rotation time for said timed token ring network, said delay being in proportion to said data arriving from said time division multiplexed ring network.

2. In a communication network having a pair of communication rings with the first ring of said pair operating under a token ring protocol and a second ring operating under a time division multiplexed, TDM, protocol, wherein a certain portion of TDM time slots are allocated to said token ring protocol, an interface unit for providing communications between nodes of said first ring and nodes of said second ring, said interface unit comprising:

means for determining a number of said time slots allocated in said second ring for said token ring protocol; and means for holding a token for a time which is dynamically varied as a function of said number of slots allocated to said token ring protocol, where holding said token limits the number of packets transmitted on said first and second rings to prevent loss of packets due to limited bandwidth provided by said number of allocated slots.

3. In a communication network having a first ring and a second ring, said first ring operating under a token based protocol and said second ring operating under a time division multiplexed, TDM, protocol, said TDM protocol allocating a certain portion of its bandwidth to said token-based protocol, said token based protocol having a methodology for establishing a target token rotation time, an apparatus for providing communications between stations of said first ring and stations of said second ring, said apparatus comprising:

a time slot separation element, TSSE, connected to receive TDM data from said second ring;

a time slot insertion element, TSIE, connected to transmit TDM data to said second ring; and a data rate adjustment element, DRAE, connected to said TSSE and said TSIE and said first ring for converting TDM data from said second ring to packet data for said first ring and for converting packet data from said first ring to TDM data for said second ring, said DRAE adding a delay to token rotation time for said first ring by holding a ring token without transmitting data.

4. A method of transmitting data between a timed token ring network and a time division multiplexed ring network as recited in claim 1 wherein said timed token ring network is a Fiberoptic Distributed Data Interface, FDDI-I, network and said time division multiplexed ring network is a Fiberoptic Distributed Data Interface, FDDI-II, network.

5. A method of transmitting data between a timed token ring network and a time division multiplexed ring network as recited in claim 1 wherein said adding step comprises the step of holding a token for said timed token ring network without transmitting data into said timed token ring network.

6. A method of transmitting data between a timed token ring network and a time division multiplexed ring network as recited in claim 1 wherein said time division multiplexed ring network allocates a portion of its bandwidth to accommodate a token ring protocol.

7. A communication network as recited in claim 2 wherein said first ring is a Fiberoptic Distributed Data Interface, FDDI-I, network and said second ring is a Fiberoptic Distributed Data Interface, FDDI-II, network.

8. A communication network as recited in claim 2 further comprising:

means for separating data from said time slots allocated in said second ring for said token ring protocol, said means for separating creating empty time slots on said second ring;

means for converting said data into data packets for transmission over said first ring;

means for converting said data packets from said first ring into time division multiplexed data; and means for inserting said time division multiplexed data into said empty time slots on said second ring.

9. A communication network as recited in claim 3 wherein said first ring is a FDDI-I network and said second ring is a FDDI-II network.

* * * * *